3,244,525
PHOTOGRAPHIC LAYERS SUITABLE FOR THE
SILVER DYE BLEACHING PROCESS
Rudolf Mory, Dornach, and Helmut Boehl, Bottmingen,
Switzerland, assignors to Ciba Limited, Basel, Switzerland, a Swiss company
No Drawing. Filed Sept. 7, 1962, Ser. No. 222,190
Claims priority, application Switzerland, Sept. 27, 1961,
11,210/61
13 Claims. (Cl. 96—99)

The silver dye bleaching process for the production of color photographs is based on the fact that there are numerous azo-dyestuffs with which a layer-former, more especially gelatine, can be dyed, and which can be bleached within the layer to an extent depending on the amount of image silver present, when acted upon by suitable so-called dye bleaching baths. The process involves a reduction reaction that is controlled by the image silver during which the azo linkages are destroyed.

Hitherto water-soluble azo-dyestuffs have been used almost exclusively for the silver dye bleaching process, since water-insoluble azo-pigments are at best only very inadequately reduced by the image silver present.

The present invention is based on the observation that certain azo-pigments do not have this disadvantage, and can therefore be used with advantage as dyestuffs for the silver dye bleaching process.

Accordingly, the present invention provides photographic layers suitable for the silver dye bleaching process which contain at least one finely dispersed azo-pigment of the general formula (1)    A—N=N—B—NH—acyl in which A and B each represent benzene radicals, and in which the acylamino group is in para-position relatively to the azo linkage.

Being pigments, the dyestuff of the Formula 1 must be free from acid groups imparting solubility in water, such as carboxylic and sulfonic acid groups, but otherwise they may contain the usual substituents, among which there may be mentioned as examples:

Alkyl groups, such as methyl or ethyl; alkoxy groups, such as methoxy or ethoxy; aryloxy groups, such as phenoxy; halogen atoms, such as fluorine, bromine or especially chlorine; nitro groups; halogen-alkyl groups, such as trifluoromethyl; acrylamino groups, such as acetylamino or benzoylamino groups; but more especially substituents that are capable of increasing the hydrophilic character of the pigments. Among the latter there may be mentioned sulfonamide groups, such as —SO$_2$NH$_2$, and substituted sulfonamide groups, such as sulfonic acid methylamide and phenylamide groups, sulfone groups such as methyl-sulfone, n-butyl-sulfone and benzyl-sulfone groups, as well as alkoxy-alkylamide group such as methoxypropylaminocarboyl and methoxypropylsulfonyl groups.

The —NH— group present in the nucleus B is in para-position relatively to the azo linkage. The acyl radical R may be derived from a sulfonic acid or from a carboxylic acid, and under certain circumstances it may be substituted. A number of azo-pigments of the Formula 1 is known, or the azo-pigments can be made by methods in themselves known by coupling the diazo-compound of an amine of the formula (2)    A—NH$_2$ with a primary aminobenzene capable of coupling of the formula (3)    B—NH$_2$ in a neutral to acid medium followed by acylation of the primary amino group.

As examples of diazo-components of the Formula 2 there may be mentioned the following amines:

Aminobenzene,
1-amino-2-, -3- or -4-chlorobenzene,
1-amino-2:5- or -3:4-dichlorobenzene,
1-amino-2-, -3- or -4-methylbenzene,
1-amino-2:4- or -2:5-dimethylbenezene,
1-amino-2-methyl-4- or -5-chlorobenzene,
1-amino-2-methoxybenzene,
1-amino-4-ethoxybenzene,
1-amino-2-methoxy-5-chlorobenzene,
1-amino-3-nitrobenzene,
1-amino-4-nitrobenzene-2-methylsulfone,
1-amino-2-chloro-5-trifluoromethylbenzene,
1-amino-2-ethylsulfonyl-5-trifluoromethylbenzene,
1-aminobenzene-3- or -4-sulfonamide,
1-amino-2-methoxybenzene-5-sulfonamide,
1-amino-2-methoxybenzene-5-sulfonic acid methylamide,
1 - amino - 2-methoxybenzene-5-sulfonic acid dimethylamide,
1-amino-2-methoxybenzene-5-sulfonic acid morpholide,
1-amino-2-methoxybenzene-5-sulfonic acid phenylamide,
1-amino-2-methoxybenzene-5-sulfonic acid-n-butylamide,
1-amino-2-methylbenzene-5-sulfonic acid diethylamide,
1 - amino - 2-methylbenzene-5-sulfonic acid cyclohexylamide,
1-amino-2-methylbenzene-5-sulfonic acid piperdide,
1 - amino - 2 - methylbenzene-5-sulfonic acid-4'-diphenyl-(1':1")-amide,
1-amino-2-methoxybenzene-5-ethylsulfone,
1-amino-2-methoxybenzene-5-n-butylsulfone,
1-amino-2-methoxybenzene-5-benzylsulfone,
1-amino-2-methoxybenzene-5-carboxylic acid methoxypropylamide,
1-amino-2-phenoxybenzene-5-carboxylic acid methoxypropylamide,
1-amino-2-(4'-chlorophenoxy)-benzene-5-carboxylic acid methoxypropylamide, As coupling components of the Formula 3 there may be mentioned:

Aminobenzene (advantageously used in the form of the ω-methane sulfonic acid)
1-amino-2-methylbenzene,
1-amino-3-methylbenzene,
1-amino-2-methoxybenzene or -ethoxybenzene,
1-amino-3-ethoxybenzene,
1-amino-2:5-dimethyl- or -dimethoxy- or -diethoxy-benzene, 1-amino-2-methoxy-5-methylbenzene,
1-amino-3-acetylaminobenzene,
1-amino-3-carbethoxyaminobenzene,
3-aminophenyl-urea,
1-amino-3-methylsulfonylaminobenzene.

As acylating agents there may be mentioned:

Actyl chloride,
Propionyl chloride,
n-Butyryl chloride,
Methane sulfonyl chloride,
Benzene sulfonyl chloride,
Para-toluene sulphonyl chloride,
Benzoyl chloride,
4-methoxy-, 4-chloro- or 4-phenyl-benzoyl chloride, 3- or 4-nitrobenzoyl chloride,
benzoyl chloride-4-methyl sulfone, and
phenyl isocyanate.

By crystallization from organic solvents, such as acetone, ethanol, benzene, dioxane, chlorobenzene or dimethylformamide, the dyestuff pigments can be easily obtained in a very pure form.

The dyestuff pigments, being completely insoluble in an aqueous medium, must be incorporated with the gelatine in a very finely divided form. The degree of fine subdivision determines inter alia the ease of bleaching and the transparency of the colored layers. The state of fine subdivision is advantageously achieved by grinding the pigments in ball mills free from metal parts or in sand mills. For wetting the pigments, or stabilizing the fine dispersions, it is of advantage to grind the pigments in the presence of wetting agents and/or dispersing agents. The fine-grinding is continued until the bulk of the pigment particles has a diameter smaller than $0.5\mu$. The duration of the grinding operation depends on the properties of the dyestuff before grinding and on the type of mill used and may also depend on other factors.

By virtue of their insolubility in aqueous media the azo-pigments used insure very good fastness to diffusion, so that neither in the casting of a multipack material nor in the subsequent processing of the material do portions of the pigment migrate into adjacent layers and cause undesired coupling to take place.

The relatively small molecule of the dyestuff pigments of the Formula 1 is split up in the reductive decomposition of the silver dye bleaching process into basic fractions of even lower molecular weight, which readily diffuse out of the layers in the acid bleaching baths. By virtue of this property pure whites can be obtained, which is very important especially in the case of images to be viewed by reflected light.

The ease with which the azo-pigments of the above Formula 1 can be bleached in the usual bleaching baths is surprising.

In general, these azo-pigments are stable in strong sulfuric acid baths containing bichromate, so that they can also be used as layer dyestuffs in those processes in which such oxidation baths are used for oxidizing the image silver.

Owing to the insolubility of the pigments they have no or hardly any tendency to chemically desensitize the silver halide emulsions. The pigments are also very compatible with the usual emulsion additives, such as hardeners or stabilizers. The pigments mainly absorb light in the short wave range of the spectrum. Accordingly, they mainly have yellow tints (greenish yellow to red).

The fastness to light of photographic layers colored with these pigments depends on the substitution of the pigments. In some cases they possess a degree of fastness to light which is far superior to that of color photographic material produced by color development.

The following example illustrates the invention, the parts and percentages being by weight unless otherwise stated, and the relationship of parts by weight to parts by volume being the same as that of the kilogram to the liter.

EXAMPLE 27.7 parts of 1-amino-2-methoxy-5-benzyl-sulfonylbenzene are diazotised in the usual manner and coupled with a solution of 13.7 parts of 1-amino-2-methoxy-5-methylbenzene in dilute hydrochloric acid at 0 to 10° C. When the coupling is complete, the hydrochloric acid coupling product is filtered off and reacted with sodium acetate in ethanol. In this manner the amino-azo-dyestuff is obtained in a unitary crystalline form.

8.5 parts of the dried dyestuff are taken up in 50 parts by volume of acetic anhydride; the mixture is heated to the boil, and then refluxed for 5 minutes at the boil. After cooling the mixture, it is filtered, and the filter radical is washed with ether and dried, to yield 7.7 parts of the acetylamino-azo-dyestuff of the formula

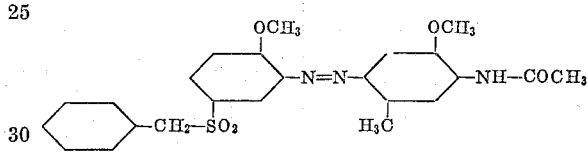

in the form of reddish yellow needles.

0.5 part of this azo-pigment is mixed with 0.5 part of sodium diisobutyl-naphthalene sulfonate and 20 parts of water and ground in a metal-free ball mill until substantially all the pigment particles have a diameter smaller than $0.5\mu$. The contents of the mill are then flushed out with 30 part of water, and intimately mixed with a solution of 12 parts of gelatine in 138 parts of water.

100 parts of this pigmented gelatine of yellow color are mixed with 200 parts of a silver bromide emulsion and cast on to glass plates. The emulsion layers are exposed under a stepped wedge, and the silver image is developed in a metol-hydroquinone developer and fixed. After the layers have been hardend in a dilute formaldehyde solution, the pigment in the layers is bleached out to an extent depending on the amount of image silver locally present in a bath containing in 1000 parts by volume 30 to 100 parts by volume of hydrochloric acid of 37% strength, 40 to 120 parts of potassium bromide, 30 to 60 parts of thiourea and 0.001 to 0.01 part of amino-hydroxyphenazine. The excess silver is then removed in an aqueous bath containing in 1000 parts by volume 100 parts of sodium chloride, 100 parts of crystalline copper sulfate and 50 parts by volume of hydrochloric acid of 37% strength, and fixing is carried out in the usual manner. Between the various baths and at the end the layers are washed with water in the usual manner. In this manner a yellow image of the wedge is obtained which is the reverse of the original silver wedge, so that the area of the originally greatest density of silver are bleached pure white, and the yellow-image has a very good fastness to light. The dyestuff emulsion described in this example may be used as the top layer of a multipack material built up in the usual manner.

Further azo-pigments suitable for the process described above are listed in the following table, in which Column I gives the diazo-components, Column II the coupling components, Column III the acylating agents and Column IV the tints of gelatine layers pigmented with the pigments.

Table

| | I | II | III | IV |
|---|---|---|---|---|
| 1 | 1-amino-2-methoxy-5-benzylsulfonly-benzene. | 1-amino-2-methoxy-5-methylbenzene | Benzoyl chloride | Reddish yellow. |
| 2 | ----do---- | ----do---- | 4-methoxybenzoyl-chloride. | Golden yellow. |
| 3 | ----do---- | 1-amino-2:5-diethoxybenzene | Benzoyl chloride | Do. |
| 4 | ----do---- | ----do---- | Acetyl chloride | Yellow orange. |
| 5 | ----do---- | 1-amino-2:5-dimethoxybenzene | ----do---- | Golden yellow. |
| 6 | ----do---- | ----do---- | Benzoyl chloride | Pale yellow. |
| 7 | ----do---- | 1-amino-2:5-dimethylbenzene | Acetyl chloride | Yellow. |
| 8 | 1-amino-2-methoxybenzene-5-sulfonamide. | 1-amino-2-methoxy-5-methylbenzene | ----do---- | Reddish yellow. |
| 9 | 1-amino-2-methoxy-5-chlorobenzene | 1-amino-2-methoxy-5-methylbenzene | ----do---- | Greenish yellow. |
| 10 | ----do---- | ----do---- | Benzoyl chloride | Golden yellow. |
| 11 | 1-amino-2-methoxy-5-n-butylsulfonyl-benzene. | 1-amino-2:5-dimethoxybenzene | Acetyl chloride | Yellow. |
| 12 | ----do---- | ----do---- | Benzoyl chloride | Do. |
| 13 | ----do---- | 1-amino-2:5-diethoxybenzene | ----do---- | Golden yellow. |
| 14 | 1-amino-2-methoxy-5-n-butylsulfonyl-benzene. | ----do---- | Acetyl chloride | Yellow orange. |
| 15 | ----do---- | 1-amino-2-methoxy-5-methylbenzene | ----do---- | Greenish yellow. |
| 16 | 1-amino-2-methoxy-5-chlorbenzene | ----do---- | Paratoluenesulfonyl chloride. | Do. |

What is claimed is:

1. A photographic silver halide layer suitable for the silver dye bleaching process containing at least one azo pigment the main share of which has a diameter smaller than 0.5µ of the formula A—N=N—B—NH—acyl in which A and B represent benzene radicals, A carries a substituent selected from the group consisting of a sulfone radical and a sulfonamide radical, and the acylamino group is in para-position to the azo linkage.

2. A photographic silver halide layer suitable for the silver dye bleaching process containing at least one azo pigment the main share of which has a diameter smaller than 0.5µ of the formula A—N=N—B—NH—acyl in which A and B represent benzene radicals, A carries a sulfone radical and the acylamino group is in para-position to the azo linkage.

3. A photographic silver halide layer suitable for the silver dye bleaching process containing at least one azo pigment the main share of which has a diameter smaller than 0.5µ of the formula A—N=N—B—NH—acyl in which A and B represent benzene radicals, A carries a sulfonamide radical and the acylamino group is in para-position to the azo group.

4. A photographic silver halide layer suitable for the silver dye bleaching process containing at least one azo pigment the main share of which has a diameter smaller than 0.5µ of the formula

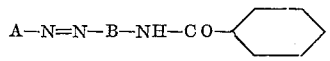

in which A and B represent benzene radicals, A carries a sulfone radical and the acylamino group is in para-position to the azo linkage.

5. A photographic silver halide layer suitable for the silver dye bleaching process containing at least one azo pigment the main share of which has a diameter smaller than 0.5µ of the formula

A—N=N—B—NH—OC—CH$_3$ in which A and B represent benzene radicals, A carries a sulfone radical and the acylamino group is in para-position to the azo linkage.

6. A photographic silver halide layer suitable for the silver dye bleaching process containing at least one azo pigment the main share of which has a diameter smaller than 0.5µ of the formula

A—N=N—B—NH—OC—CH$_3$ in which A and B represent benzene radicals, A carries a sulfonamide radical and the acylamino group is in para-position to the azo group.

7. A photographic silver halide layer suitable for the silver dye bleaching process containing at least one azo pigment the main share of which has a diameter smaller than 0.5µ of the formula

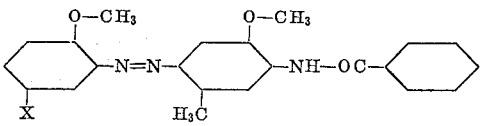

in which X represents a sulfone radical.

8. A photographic silver halide layer suitable for the silver dye bleaching process containing at least one azo pigment the main share of which has a diameter smaller than 0.5µ of the formula

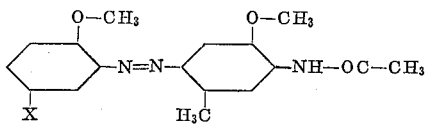

in which X represents a sulfone radical.

9. A photographic silver halide layer suitable for the silver dye bleaching process containing at least one azo pigment the main share of which has a diameter smaller than 0.5µ of the formula

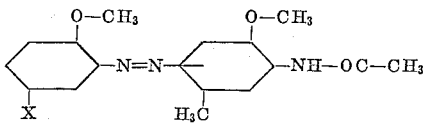

in which X represents a sulfonamide radical.

10. A photographic silver halide layer suitable for the silver dye bleaching process containing an azo pigment the main share of which has a diameter smaller than 0.5µ of the formula

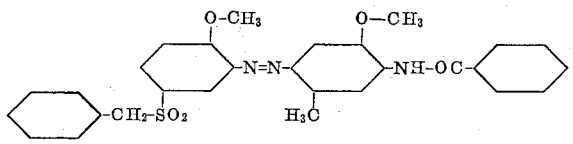

11. A photographic silver halide layer suitable for the silver dye bleaching process containing an azo pigment of the main share of which has a diameter smaller than 0.5µ of the formula

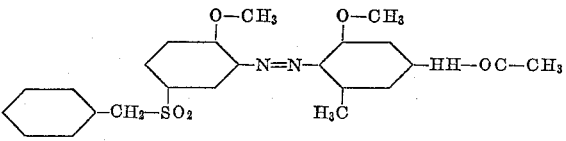

12. A photographic silver halide layer suitable for the silver dye bleaching process containing an azo pigment the main share of which has a diameter smaller than 0.5µ of the formula

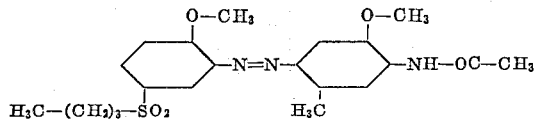

13. A photographic silver halide layer suitable for the silver dye bleaching process containing an azo pigment the main share of which has a diameter smaller than 0.5µ of the formula

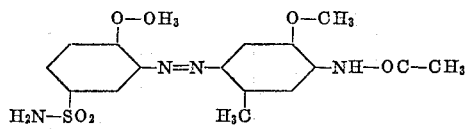

References Cited by the Examiner

UNITED STATES PATENTS 2,864,816  12/1958  Nicolaus et al. _____ 260—207

FOREIGN PATENTS 422,522  2/1936  Great Britain.

OTHER REFERENCES

Cornwell-Clyne, "Colour Photography, page 420, Chapman and Hall, 37 Essex St., London (1951).

NORMAN G. TORCHIN, *Primary Examiner.*

J. T. BROWN, *Assistant Examiner.*